United States Patent [19]

Merz et al.

[11] Patent Number: 4,582,522
[45] Date of Patent: Apr. 15, 1986

[54] METHOD OF MONITORING THE MOVEMENT OF A MEMBER IN A GLASSWARE FORMING MACHINE OF THE INDIVIDUAL SECTION TYPE

[75] Inventors: Steven G. Merz, Thalwil; Rene Keller; Carl W. Schmitt, both of Zurich, all of Switzerland

[73] Assignee: Emhart Industries, Inc., Farmington, Conn.

[21] Appl. No.: 715,567

[22] Filed: Mar. 25, 1985

[30] Foreign Application Priority Data

Apr. 6, 1984 [GB] United Kingdom ............... 8408997

[51] Int. Cl.⁴ .................................... C03B 9/40
[52] U.S. Cl. .......................... 65/29; 65/158; 65/160; 65/163
[58] Field of Search ............ 65/29, 158, 159, 160, 65/163

[56] References Cited

U.S. PATENT DOCUMENTS

| 4,266,961 | 5/1981 | Wood .................................. 65/29 |
| 4,367,087 | 1/1983 | Cardenas-Franco et al. .... 65/164 X |
| 4,400,192 | 8/1983 | Farkas ................................. 65/29 |
| 4,445,923 | 5/1984 | Shetterly ........................... 65/158 |
| 4,459,146 | 7/1984 | Farkas et al. ...................... 65/29 |

FOREIGN PATENT DOCUMENTS

WO82/02878 9/1982 PCT Int'l Appl. ............. 65/158

Primary Examiner—Arthur Kellogg
Attorney, Agent, or Firm—Arthur B. Moore

[57] ABSTRACT

The method is for monitoring the movement of a member which is moved along a path which has a vertical component and an arcuate component about a vertical axis. The movement is brought about by a piston movable in a cylinder and having a piston rod projecting therefrom on which the member is mounted. A cam which engages a cam track is mounted on the piston rod or a further piston rod of the piston and acts to cause the arcuate movement. The method comprises mounting a proximity detector on the cam track to sense the piston rod, connecting the proximity detector to a contactless connector so that signals are passed from the mechanism to a transmitter of the connector mounted on the machine frame, and comparing signals received by the transmitter with signals indicating the stage reached in the cycle of operation.

10 Claims, 3 Drawing Figures

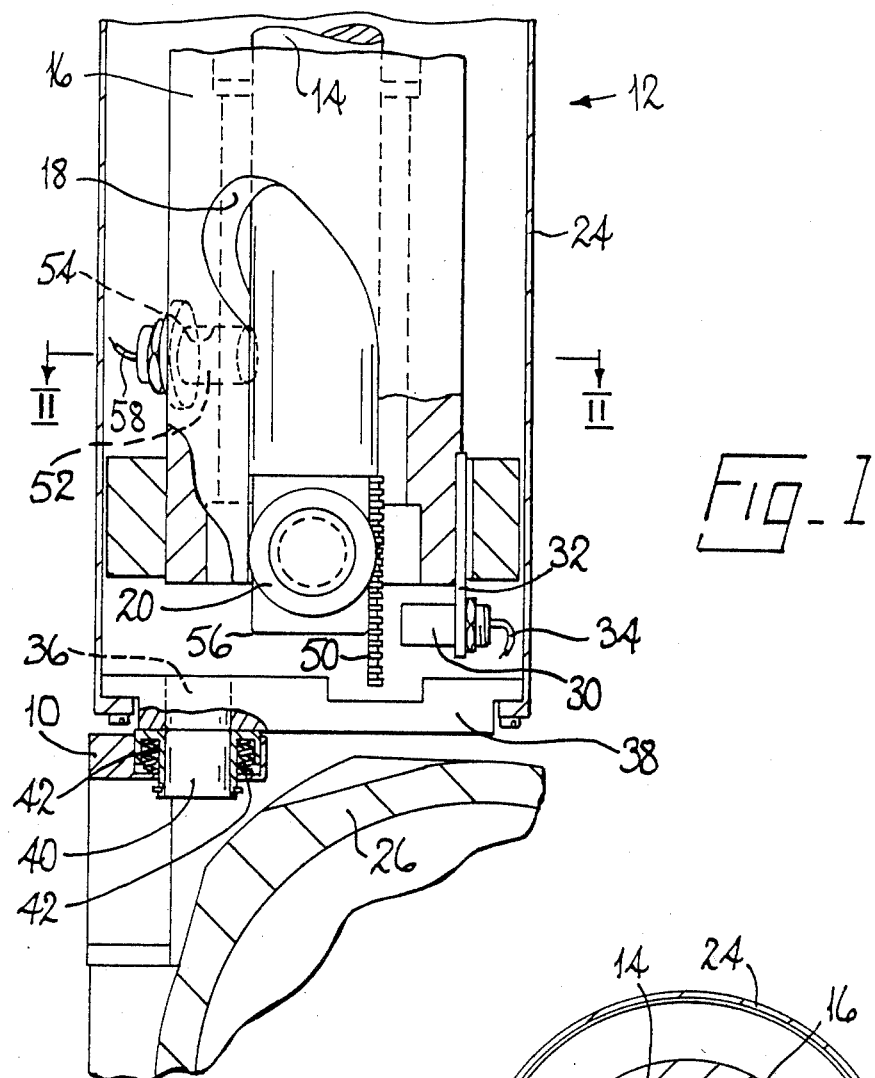
Fig_1
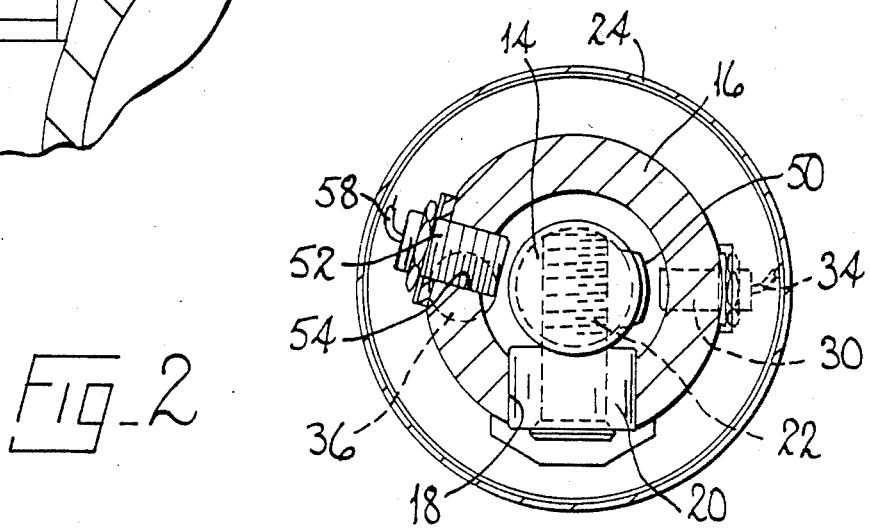
Fig_2

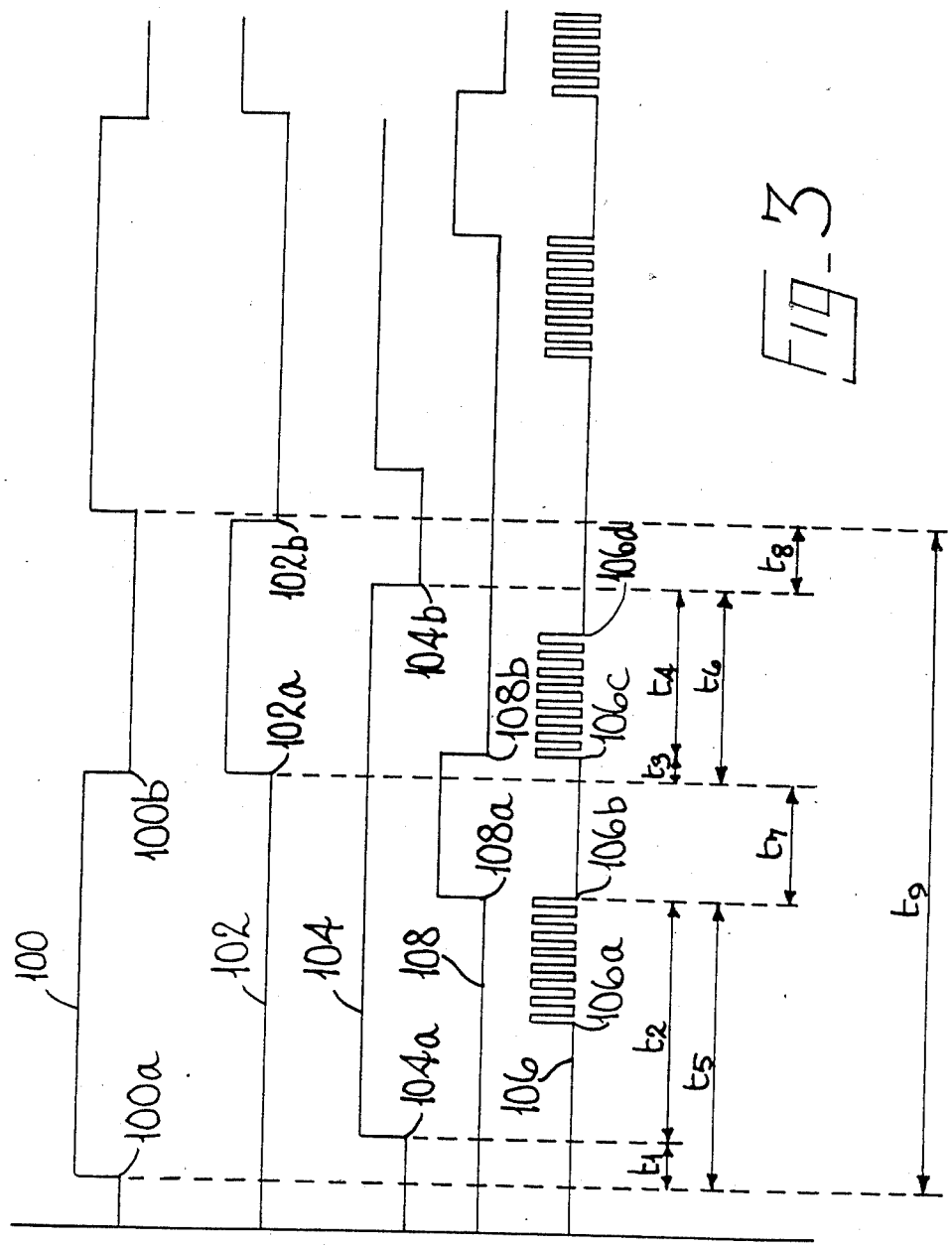

METHOD OF MONITORING THE MOVEMENT OF A MEMBER IN A GLASSWARE FORMING MACHINE OF THE INDIVIDUAL SECTION TYPE

BACKGROUND OF THE INVENTION

Glassware forming machines of the individual section type are well known and comprise a number of individual glassware forming units (known as sections) which receive gobs of molten glass from a common source and feed their output to a common conveyor. Each section has a mould arrangement which operates to form parisons and a further mould arrangement which operates to blow the parisons into the shape of glassware containers. Conventional machines of the individual section type have various members which, in the operation of the machine, are moved between operative and out-of-the-way positions thereof along a path which has a vertical component and an arcuate component about a vertical axis. Thus, the member swings into alignment with parts with which it co-operates as it is moved downwardly towards those parts. Such members are the funnels used to guide gobs of molten glass to the parison mould arrangement of a section, baffles which are used to close top portions of the moulds of the parison mould arrangement, and blow heads which are used to blow air into parisons at the blow mould arrangement of the section. For example, a blow head is moved from a position out of alignment with a mould and above the mould along a path which by a combination of vertical downwards movement and swinging movement about a vertical axis brings the blow head into engagement with the mould. In conventional individual section type machines, the members are moved along such paths by fluid-pressure operated moving mechanisms each comprising a vertically-extending cylinder, a piston movable vertically in the cylinder upon the introduction of fluid under pressure into the cylinder, a first piston rod projecting from said piston along said vertical axis, the member being mounted on the first piston rod for movement therewith, a second piston rod projecting from said piston in the opposite direction to said first piston rod, and cam means acting on the second piston rod to cause it to turn about the vertical axis as it moves vertically. Thus, the piston and the first piston rod are turned about the vertical axis and the member is moved arcuately about the vertical axis. The cam means comprises a cam track extending adjacent to the second piston rod and a cam follower in the form of a roller which is mounted on the second piston rod and engages the cam track. In some cases, the cam means can act on the first piston rod so that the second piston rod is not required.

Where machines of the individual section type are operated by electronic control means which acts to provide impulses which cause the introduction of fluid under pressure into the cylinders of moving mechanisms of the machine either above or below the piston, it has been recognised that it is desirable to provide feedback to the control means relating to the time of arrival of the members in their operative or out-of-the-way positions. If this is done, it is possible to ensure that any slow-acting mechanisms are compensated for by allowing an earlier operating impulse therefor. Furthermore, it is not necessary to allow extra time for the mechanism to reach its operative or out-of-the-way positions in order to prevent collisions between various parts of the machine but instead the cycle time of the machine can be decreased thereby giving greater production. However, difficulties arise in detecting movement of such members because the environment in which the member moves is generally hostile to electronic detectors because of the presence of molten glass and/or excessive heat in this environment.

It is an object of the present invention to provide a method of monitoring the movement of a member of the type described above in which method proximity detectors can be used.

BRIEF SUMMARY OF THE INVENTION

The invention provides a method of monitoring the movement of a member in a glassware forming machine of the individual section type which member moves, in a cycle of operation of the machine, between operative and out-of-the-way positions thereof along a path which has a vertical component and an arcuate component about a vertical axis, the movement being brought about by a fluid-pressure operated moving mechanism comprising a vertically-extending cylinder, a piston movable vertically in the cylinder upon the introduction of fluid under pressure into the cylinder, a piston rod projecting from said piston along said vertical axis, the member being mounted on the piston rod for movement therewith, and cam means acting on the piston rod, or on a second piston rod projecting from said piston in the opposite direction to said first piston rod, to cause the piston rod to turn about the vertical axis as it moves vertically so that the piston is turned about the vertical axis and the member is moved arcuately about the vertical axis, the cam means comprising a cam track extending adjacent to the piston rod on which the cam means acts and a cam follower which is mounted on the piston rod and engages the cam track, wherein the method comprises mounting a proximity detector on the cam track at a position in which it senses a portion of the piston rod when the member is in its operative position, connecting the proximity detector to a receiver of a contactless connector mounted on the moving mechanism so that, when the moving mechanism is mounted on the frame of a glassware forming machine, it is adjacent to a transmitter of the contactless connector mounted on the frame and the receiver passes the signals of the proximity detector to the transmitter, and comparing signals received by the transmitter with signals indicating the stage reached in the cycle of operation of the machine.

In a method according to the last preceding paragraph, the proximity detector is mounted on the cam track which is well away from the hostile environment in which the member is located and may be contained in a protective casing which surrounds the cam track. Furthermore, in many cases, the moving mechanism is mounted in a hole in a table-like plate of the frame of the machine so that the member moved by the mechanism is above the plate and the cam track is below the plate so that the proximity detector is protected by the plate. Location of the proximity detector in such an enclosed environment would normally create problems with the electrical connections since the moving mechanisms are from time to time exchanged for replacement mechanisms by lifting the mechanism away from the frame and replacing it with a new mechanism. It is, thus, not practical to provide plug type connections to the proximity detector which would be inaccessible and require a prolonged shut-down of the machine to allow exchange of mechanisms to be carried out. This problem, however, is avoided by the use of a contactless connector. A suitable contactless connector can be obtained from the Swiss firm Wepatron AG under designation 20/15.

Where the member is a baffle which moves, in a cycle of operation of the machine, from its out-of-the-way position to a first operative position thereof on top of a funnel on a mould, then back towards its out-of-the-way position, then to a second operative position thereof on top of the mould, and then back to its out-of-the-way position, the proximity detector may be positioned to sense the portion of the piston rod when the baffle is in its first operative position. In this case, the method may also comprise mounting a second proximity detector on the cam track at a position in which it senses a portion of the piston rod when the baffle is in its second operative position, connecting the second proximity detector to a receiver of a second contactless connector mounted in similar manner to the first-mentioned contactless connector so that the receiver passes the signals of the second proximity detector to a transmitter of the second contactless connector mounted on the frame, and comparing signals received by the transmitter with signals indicating the stage reached in the cycle of operation of the machine. In this way, both operative positions of the baffle may be monitored.

Since the position of the member in its operative position may vary, for example when moulds are changed, and also to increase the accuracy of the position sensing, it is advantageous if the portion of the piston rod which is sensed by the proximity detector is formed with regularly-spaced magnetic discontinuities which generate a series of signals as they pass the proximity detector, so that the number of signals generated indicates the position of the member. The magnetic discontinuities may be formed by attaching a toothed rack to the piston rod, or by applying a screw-thread to a portion thereof. If the portion to be sensed has to pass through the seal into the cylinder, in which the piston moves, the portion can be screw-threaded or formed with grooves and the thread or grooves covered or filled in by non-magnetic material having a cylindrical outer surface.

In a method in accordance with the last preceding paragraph, greater accuracy can be obtained if the proximity detector forms one of a group of two or more proximity detectors mounted adjacent to one another and arranged to sense the magnetic discontinuities, the detectors being positioned so that their signals are out of phase with one another and the signals of the detectors in a group are combined to form a combined output. The combined output has sharper signals than the output of a single detector.

In a method in accordance with either one of the last two preceding paragraphs, where the member is a baffle which moves, in a cycle of operation of the machine, from its out-of-the-way position to a first operative position thereof, on top of a funnel on a mould, then back towards its out-of-the-way position, then to a second operative position thereof on top of the mould, and then back to its out-of-the-way position, it is advantageous if the portion of the piston rod is so arranged that the magnetic discontinuities are sensed by the proximity detector or detectors in both the first and the second operative positions of the member. In this way, a single proximity detector or group of detectors can be used to detect both the first and the second operative positions of the baffle.

In a method in accordance with the last preceding paragraph, in order to enable the positions reached by the baffle in successive cycles of operation to be compared and thereby give warning of abnormal conditions, the number of signals generated as the baffle moves from its out-of-the-way position to its first operative position may be recorded giving the first operative position of the baffle. From this number the number of signals generated as the baffle moves back towards its out-of-the-way position may be subtracted and to this number added the number of signals generated as the baffle moves to its second operative position to give a number indicating the second operative position. In each cycle of operation, the number of signals generated as the baffle moves from its out-of-the-way position to its first operative position, and the number indicating the second operative position are compared with the equivalent numbers achieved in the immediately preceding cycle of operation and, in the event of discrepancy between the numbers, emergency action is taken.

Since it may be advantageous to monitor the out-of-the-way position of the member as well, the method may also comprise mounting a further proximity detector on the cam track at a position in which it senses a portion of the piston rod when a member is in its out-of-the-way position, connecting the further proximity detector to a receiver of a further contactless connector mounted in similar manner to the first-mentioned contactless connector so that the receiver passes the signals of the further proximity detector to a transmitter of the further contactless connector mounted on the frame, and comparing signals received by the transmitter with signals indicating the stage reached in the cycle of operation of the machine.

The proximity detector may be a Hall sensor which depends on the Hall effect, i.e. that when a magnetic field is applied perpendicular to a conductor carrying current, a potential difference is observed between points on opposite sides of the conductor, points which in the absence of the field would be at the same potential. A suitable Hall sensor can be obtained from the W. German firm Siemens A.G. under designation FP210 L100.

In order to improve the reliability, when the moving mechanism is mounted on the frame, either the receiver or the transmitter of the contactless connector may be spring-urged towards the other.

BRIEF DESCRIPTION OF THE DRAWINGS

There now follows a detailed description, to be read with reference to the accompanying drawings of a method of monitoring the movement of a member in a glassware forming machine of the individual section type which is illustrative of the invention. It is to be understood that the illustrative method has been selected for description by way of example and not of limitation of the invention.

In the drawings:

FIG. 1 is a side elevational view, with parts broken away to show the construction, of a lower end portion of a moving mechanism of a glassware forming machine of the individual section type;

FIG. 2 is a cross-sectional view taken on the line II—II in FIG. 1; and

FIG. 3 is a diagrammatic view showing the relationship of various electronic signals produced in the operation of the glassware forming machine.

DETAILED DESCRIPTION OF PREFERRED EMBODIMENT OF THE INVENTION

FIG. 1 shows a portion of a frame 10 of a glassware forming machine of the individual section type. The frame 10 comprises a horizontal plate (not shown) in which a circular hole (also not shown) is formed. In this circular hole a moving mechanism 12 of the machine is mounted. The moving mechanism 12 is arranged, in a cycle of operation of the machine, to move a member between an operative and an out-of-the-way position thereof along a path which has a vertical component and an arcuate component about a vertical axis. The member may be a baffle, a funnel, or a blow head. The moving mechanism 12 is operated by fluid-pressure, viz air pressure, and comprises a vertically-extending cylinder (not shown), a piston movable vertically in the cylinder upon the introduction of air under pressure into the cylinder, a first piston rod projecting from the piston upwardly along a vertical axis, the member being mounted on the first piston rod for movement therewith, a second piston rod 14 projecting from said piston in the opposite direction to said first piston rod, and cam means acting on the second piston rod to cause it to turn about the vertical axis as it moves vertically so that the piston and the first piston rod are turned about the vertical axis and the member is moved arcuately about the vertical axis. The cam means comprises a cam track 16 which is generally cylindrical and surrounds the piston rod 14. The cam track 16 has a groove 18 therein into which extends a roller 20 mounted on a pin 22 which is supported by a lower end portion of the piston rod 14. Thus, the cam track 16 extends adjacent to the second piston rod 14 and the roller 20 which is mounted on the second piston rod 14 engages the cam track. The groove 18 is so shaped that, as the piston rod 14 moves upwardly from a lowermost position thereof (shown in FIG. 1), it first moves vertically upwards along the groove 18 and then is caused to turn about a vertical axis by the shape of the groove 18. Thus, the member mounted on the first piston rod is moved first vertically upwards and then upwards and arcuately about a vertical axis simultaneously. Downwards movement of the second piston rod 14 causes the member to move along the same path but in the opposite direction. The cam track 16 is contained within a hollow cylindrical casing 24. Moving mechanisms of the type described above are well-known in the glassware forming industry so that a more detailed description of the moving mechanism is not considered necessary. The position of the moving mechanism 12 in the machine is indicated by the portion of a mould-closing cylinder 26 shown in FIG. 1.

The illustrative method is a method of monitoring the movement of the member which is moved by the moving mechanism 12. The illustrative method comprises mounting a proximity detector 30 on the cam track 16 at a position in which it senses a portion of the piston rod 14 on which the cam means acts when the member is in its operative position. The detector 30 is of the Hall type and is mounted on a bracket 32 which depends from the cam track 16. The illustrative method also comprises connecting the proximity detector 30 by means of wires 34 to a receiver 36 of a contactless connector mounted on the moving mechanism. The receiver 36 is mounted in a recess of a lower end cap 38 of the casing 24. A contactless connector is a device which comprises a receiver and a transmitter which are mounted adjacent one another but which are not connected by wires. The receiver receives electrical impulses from a device to which it is connected and passes them to the transmitter from which they can be passed to signal reading means. Such a contactless connector can be obtained from the Swiss firm Wepatron AG under designation 20/15. The receiver 36 is arranged so that, when the moving mechanism 12 is mounted on the frame 10, it is adjacent to a transmitter 40 of the contactless connector mounted on the frame 10. The transmitter 40 is urged by two springs 42 into engagement with the receiver 36. The receiver 36 passes the signals of the proximity detector 30 to the transmitter 40.

The detector 30 may detect the presence or absence of the lowermost end of the piston rod 14 but, in the illustrative method, it is arranged to detect the presence of teeth on a serrated portion of the piston rod 14 formed by a rack 50. The rack 50 extends vertically so that, during the latter part of a downwards movement of the piston rod 14, the rack 50 passes the detector 30 and the teeth thereof are detected successively. The detector 30 therefore produces a series of pulses with each pulse corresponding to the presence of one of the teeth of the rack 50. It is, therefore, possible to deduce how far downwards the piston rod 14 has moved by the number of pulses produced by the detector 30.

The illustrative method also comprises mounting a further proximity detector 52 on the cam track 16 at a position at which it senses a portion of the second piston rod 14 when the member is in its out-of-the-way position. The detector 52 is mounted in a threaded bore 54 in the cam track 16 and is arranged to detect the presence or absence of the piston rod 14 so that when a lower corner 56 of the piston rod 14 passes the detector 54 the detector indicates that the member is in its out-of-the-way position. The illustrative method further comprises connecting the further proximity detector 52 by means of wires 58 to a receiver (not shown) of a further contactless connector mounted in similar manner to the first mentioned contactless connector 36,40 so that the receiver passes the signals of the further proximity detector 52 to a transmitter of the further contactless connector mounted on the frame 10. The further proximity detector 52 is also of the Hall type. The transmitter of the further contactless connector is spring loaded towards the receiver thereof in similar manner to the transmitter 40 but it should be noted that it is possible to provide springs which spring load the receiver towards the transmitter. Thus, either the receiver or the transmitter of the contactless connector is spring-urged towards the other.

The moving mechanism 12 may be used to move a baffle which moves, in a cycle of operation of the machine, from its out-of-the-way position to an intermediate position thereof, then back to its out-of-the-way position, then to its operative position, and then back to its out-of-the-way position. In its intermediate position, the baffle rests on top of a funnel on top of a mould of the machine and air is blown through passages in the baffle to cause a gob of molten material in the mould to be pressed downwardly in the mould. Removal of the baffle from its intermediate position to its out-of-the-way position allows the funnel to be removed and the baffle is then moved to its operative position in which it completes a mould cavity of the mould. In this case, the serrated portion of the piston rod 14 which forms the rack 50 is so arranged that the teeth thereof are sensed by the proximity detector 30 in both the intermediate and operative positions of the baffle. Thus, a different number of pulses is produced in moving the baffle to its intermediate position from the number produced in moving it to its operative position but the single proximity detector 30 can detect whether the member is in either of these positions.

The illustrative method also comprises comparing signals received by the transmitter 40 with signals indicating the stage reached in the cycle of operation of the machine so as to determine whether the member is reaching its operative position at the correct stage. These signals are produced continuously throughout a cycle of operation as a train of pulses. For example, if the member should reach its operative position after 500 pulses and the final pulse of the output of the detector 30 is also received after 500 pulses, the machine is operating correctly. The method further comprises comparing the signals received by the transmitter of the contactless connector which is connected to the detector 52 with the signals indicating the stage reached in the cycle of operation of the machine to determine whether the member is reaching its out-of-the-way position at the desired stage. Where the member moved is a baffle, the illustrative method also comprises comparing the signals of the detector 30 with the signals indicating the state reached in the cycle of operation of the machine to determine whether the baffle has reached its intermediate position at the desired stage. These comparisons are carried out by electronic control means the construction of which will be apparent to those skilled in the art.

FIG. 3 illustrates the signals produced in the operation of the machine. In FIG. 3 are shown electrical signals produced when the moving mechanism 12 is used to move a funnel of a machine. The uppermost trace 100 is an event signal produced by control means of the machine to cause the funnel to be moved downwards to its operative position. At the point 100a the control means indicates that the mechanism should move the funnel to its operative position by increasing the voltage indicated by the trace 100. At the point 100b the control means indicate that the mechanism should move the funnel back to its out-of-the-way position. Thus, between the points 100a and 100b air under pressure is introduced into the cylinder of the mechanism 12 above the piston thereof. The trace 102 is an event signal produced by the control means to cause the funnel to be moved into its out-of-the-way position. At point 102a the signal is increased so that air under pressure is introduced into the cylinder of the mechanism 12 below the piston thereof so that the funnel is raised towards its out-of-the-way position and at the point 102b this air under pressure is removed. The trace 104 indicates the output of the detector 52 which indicates whether the funnel is in its out-of-the-way position. At the point 104a the detector 52 indicates that the funnel has left its out-of-the-way position and at the point 104b the detector 52 indicates that the funnel has reached its out-of-the-way position again. The trace 106 shows the output of the proximity detector 30. At the point 106a the rack 50 begins to pass the detector 30 which then begins to produce a series of pulses as indicated on the trace 106. At the point 106b the funnel reaches its operative position. At the point 106c the funnel leaves its operative position and the detector 30 produces pulses as the teeth of the rack 50 pass it moving upwardly and at the point 106d the lowermost end of the rack 50 has moved away from the detector 30. Time periods t1 to t9 are indicated in FIG. 3. t1 represents the downwards movement delay start time which is a delay between the event signal indicating that the funnel should be moved downwards and the funnel actually beginning its downwards movement. t2 is the downwards travel time of the funnel. t3 is the upwards delay start time. t4 is the upwards travel time. t5 is the downwards action time which is the time that the machine requires to move the funnel downwards and is equal to t1 plus t2. t6 is the upwards action time which is equal to t3 plus t4. t7 is the rest time in the operative position. t8 is the rest time in the out-of-the-way position and t9 is the cycle time. It will be apparent that the provision of the detectors 30 and 52 enables the times t1 to t8 to be known and makes it possible for various modifications to these times to be achieved to enable the machine cycle to be speeded up without the risk of collisions between pairs of the machine. For example, the event signal 100 may be commenced earlier to take account of the time t1.

The trace 108 in FIG. 1 illustrates the signal produced when the rack 50 is not present and the detector 30 is used to detect a bottom corner of the piston rod 14. At point 108a the member reaches its operative position and at point 108b leaves it again.

Where the rack 50 is present, the signals from the detector 30 form a series of pulses as shown in FIG. 3. These pulses can be used if desired to obtain information about the speed of the member during the later part of its movement.

It will be apparent that the detectors 30 and 52 are protected from excesses of temperature and from molten glass by the casing 24 and by being beneath the horizontal plate of the machine frame 10. Furthermore, when it is necessary to exchange the mechanism 12 for a similar such mechanism, the mechanism can be lifted out of the hole in the horizontal plate of the frame 10 so that the receiver 36 is lifted away from the transmitter 40 of the contactless connector. The replacement mechanism can then be inserted in the hole so that a receiver of its contactless transmitter is adjacent to the transmitter 40 and can pass signals thereto. Thus, the mechanism 12 can be exchanged quickly and without making plug connections.

We claim:

1. A method of monitoring the movement of a member in a glassware forming machine of the individual section type which member moves, in a cycle of operation of the machine, between operative and out-of-the-way positions thereof along a path which has a vertical component and an arcuate component about a vertical axis, the movement being brought about by a fluid-pressure operated moving mechanism comprising a vertically-extending cylinder, a piston movable vertically in the cylinder upon the introduction of fluid under pressure into the cylinder, a piston rod projecting from said piston along said vertical axis, the member being mounted on the piston rod for movement therewith, and cam means acting on the piston rod, or on a second piston rod projecting from said piston in the opposite direction to said first piston rod, to cause the piston rod to turn about the vertical axis as it moves vertically so that the piston is turned about the vertical axis and the member is moved arcuately about the vertical axis, the cam means comprising a cam track extending adjacent to the piston rod on which the cam means acts and a cam follower which is mounted on the piston rod and engages the cam track, wherein the method comprises mounting a proximity detector on the cam track at a position in which it senses a portion of the piston rod when the member is in its operative position, connecting the proximity detector to a receiver of a contactless connector mounted on the moving mechanism so that, when the moving mechanism is mounted on the frame of the glassware forming machine, it is adjacent to a transmitter of the contactless connector mounted on the frame and the receiver passses the signals of the proximity detector to the transmitter, and comparing signals received by the transmitter with signals indicating the stage reached in the cycle of operation of the machine.

2. A method according to claim 1, wherein the member is a baffle which moves, in a cycle of operation of the machine, from its out-of-the-way position to a first operative position thereof on top of a funnel on a mould, then back towards its out-of-the-way position, then to a second operative position thereof on top of the mould, and then back to its out-of-the-way position, and wherein the proximity detector is positioned to sense the portion of the piston rod when the baffle is in its first operative position, and the method also comprises mounting a second proximity detector on the cam track at a position in which it senses a portion of the piston rod when the baffle is in its second operative position, connecting the second proximity detector to a receiver of a second contactless connector mounted in similar manner to the first-mentioned contactless connector so that the receiver passes the signals of the second proximity detector to a transmitter of the second contactless connector mounted on the frame, and comparing signals received by the transmitter with signals indicating the stage reached in the cycle of operation of the machine.

3. A method according to claim 1, wherein the portion of the piston rod which is sensed by the proximity detector is formed with regularly-shaped magnetic discontinuities which generate a series of signals as they pass the proximity detector, so that the number of signals generated indicates the position of the member.

4. A method according to claim 3, wherein the proximity detector forms one of a group of two or more proximity detectors mounted adjacent to one another and arranged to sense the magnetic discontinuities, the detectors being positioned so that their signals are out of phase with one another and the signals of the detectors in a group are combined to form a combined output.

5. A method according to claim 3, wherein the member is a baffle which moves, in a cycle of operation of the machine, from its out-of-the-way position to a first operative position thereof on top of a funnel on a mould, then back towards its out-of-the-way position, then to a second operative position thereof on top of the mould, and then back to its out-of-the-way position, and wherein the portion of the piston rod is so arranged that the magnetic discontinuities are sensed by the proximity detector in both the first and the second operative positions of the member.

6. A method according to claim 5, wherein the number of signals generated as the baffle moves from its out-of-the-way position to its first operative position is recorded, from this number the number of signals generated as the baffle moves back towards its out-of-the-way position is subtracted, and to this number is added the number of signals generated as the baffle moves to its second operative position to give a number indicating the second operative position.

7. A method according to claim 6, wherein in each cycle of operation, the number of signals generated as the baffle moves from its out-of-the-way position to its first operative position, and the number indicating the second operative position are compared with the equivalent numbers achieved in the immediately preceding cycle of operation and, in the event of discrepancy between the numbers, emergency action is taken.

8. A method according to claim 1, wherein the method also comprises mounting a further proximity detector on the cam track at a position in which it senses a portion of the piston rod when the member is in its out-of-the-way position, connecting the further proximity detector to a receiver of a further contactless connector mounted in similar manner to the first-mentioned contactless connector so that the receiver passes the signals of the further proximity detector to a transmitter of the further contactless connector mounted on the frame, and comparing signals received by the transmitter with signals indicating the stage reached in the cycle of operation of the machine.

9. A method according to claim 1, wherein the proximity detector is a Hall sensor.

10. A method according to claim 1, wherein, when the moving mechanism is mounted on the frame, either the receiver or the transmitter of the or each contactless connector is spring-urged towards the other.

* * * * *